United States Patent Office 2,762,348
Patented Sept. 11, 1956

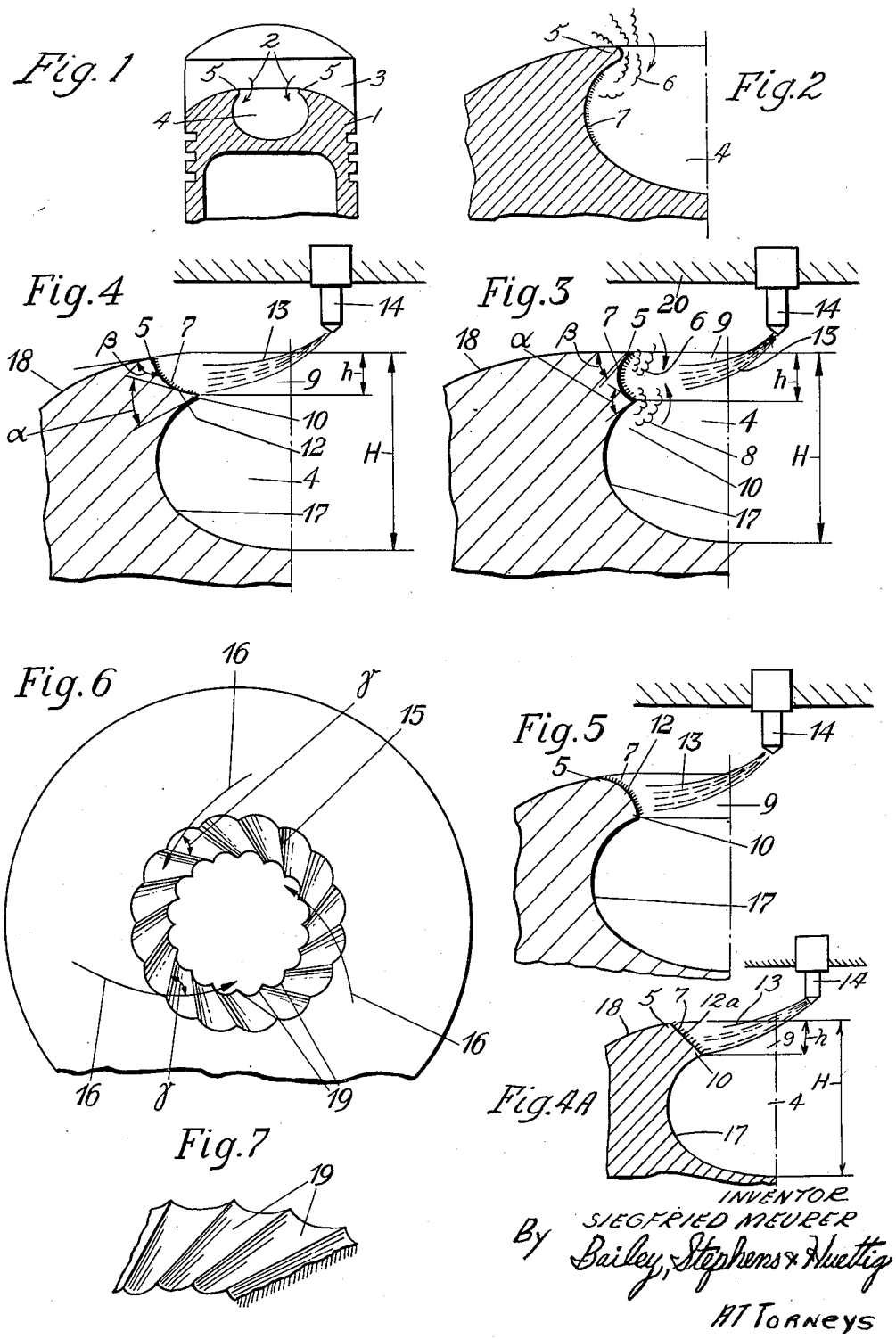

2,762,348

MIXING ARRANGEMENT IN INTERNAL COMBUSTION ENGINE

Siegfried Meurer, Nurnberg, Germany

Application February 24, 1953, Serial No. 338,455

Claims priority, application Germany February 22, 1952

9 Claims. (Cl. 123—32)

The invention relates to improvements in internal combustion engines, more particularly in the combustion chambers of high speed diesel engines of the type described in my copending application Serial No. 480,432, filed January 7, 1955, for "Operation of Internal Combustion Engines," as a continuation-in-part of the earlier application Serial No. 325,316 of December 11, 1952, entitled "Injection System for Internal Combustion Engine," now abandoned.

It is an object of the present invention to further improve the atomizing and mixing characteristics of the combustion chamber so as to improve the efficiency and operating characteristics of the engine.

With this and other objects in view, this invention consists in the details of construction, combination of elements and cooperation hereinafter set forth and then specifically designated by the claims.

In order that those skilled in the art to which this invention appertains may understand how to make and use the same, I will describe its construction in detail, referring by numerals to the accompanying drawings forming part of this application, in which:

Fig. 1 is an axial section of the upper part of a cylinder and piston arrangement including a combustion chamber as previously proposed, Fig. 2 is a part view of Fig. 1, on a larger scale, Fig. 3 is a view similar to Fig. 2, but showing a combustion chamber having the invention applied thereto, Fig. 4 is a similar view, but showing a modification, Fig. 4a is a similar view, but showing a further modification, Fig. 5 is a similar view but showing a still further modification, Fig. 6 is an end view of a piston with a combustion chamber embodying a special feature of the present invention; and Fig. 7 is a perspective view thereof.

Similar reference numerals denote similar parts in the different views.

Referring now to the drawings in greater detail, and first to Figs. 1 and 2, relating to the combustion chamber of a high speed diesel engine according to the above mentioned copending application, it will be seen that the combustion chamber 4 is disposed in the piston 1 and constitutes a space generated by rotation. The fuel nozzle (not shown) is arranged in the cylinder cover in an oblique or slanting eccentric position, in such a way that the fuel supplied by that nozzle is first deposited on the wall of the combustion chamber in the form of a thin film and simultaneously the air is imparted such a rotary motion, as it is flowing into that chamber, that the fuel is thereby gradually detached or "kicked off" from that wall, in the form of a vapor, mixed, and burnt. It will be seen that the combustion chamber is constructed in a slightly flattened spherical form. The outlet opening of the spherical cavity towards the engine cylinder is formed by a cylindrical neck portion whose cross section is about 65% of the maximum cross section of the combustion chamber.

The movement of the air in this process serves two different ends; it must cause a sufficiently quick and efficient detaching of the vaporized fuel and moreover a subsequent mixing of the vaporized fuel with air. There can be distinguished two different kinds of movement of the air: First, the so-called "squeeze flow" which is due to the displacement of the air from the main combustion chamber—or cylinder chamber—into the cavity 4 of the piston and whose velocity is determined by the piston speed, and second a circular air flow around the axis of the cylinder produced during the suction stroke, for example, by a spiral intake air duct. Both kinds of air movements are occurring simultaneously. For the formation of the mixture when spraying the fuel onto the wall of the combustion chamber the squeeze flow proved to be insufficient, because the velocity of the air becomes zero in the vicinity of the upper dead center position, i. e. that range of angles of the crank which is particularly important for the formation of the mixture. Contrary thereto, the rotary coaxial movement reaches its maximum velocity with a centrally disposed combustion chamber in the very upper dead centre position; hence it is particularly suitable for detaching or "licking off" the deposited fuel. However, since the air motion must be sufficiently brisk in order to be able to detach the fuel quickly, one will endeavor to utilize in addition to the rotary motion also the "squeeze flow" which can be produced with very simple means. Primarily by the squeeze flow there are produced turbulent detaching phenomenons at the inlet edges which are existing in a divided piston chamber, said detaching phenomenons causing a local intensification of the mixing effect.

Figs. 1 and 2 illustrate these phenomenons. As the piston 1 rises, the air flows in the direction of the arrows 2 from the cylinder space 3 into the piston space 4, producing eddies 6 at the edge 5 which are shown in Fig. 2 on a larger scale. These eddies 6 together with the rotary motion of the air act upon the fuel film 7 and the vapors rising therefrom. As the air flows out, further eddies 8 are formed which, however, cannot influence any more the fuel film deposited at 7.

According to Fig. 3 the passage 9 is shaped so as to form a concave curvature. The fuel spray 13 is injected by fuel supply means, not shown, through a fuel nozzle 14 eccentrically secured in the cylinder cover 20. It will be seen that in this case both the inlet eddies 6 generated at the edge 5 and the outlet eddies 8 generated at the edge 10 are able to act upon the fuel which has been deposited by the nozzle 14 on the surface of the passage 9, as indicated at 7. In the embodiment shown in Fig. 4 the passage 9 is funnel-shaped. The funnel may be conical as shown at 12a, Fig. 4a, but preferably it is arched, as shown at 12, so as to serve as a guiding surface for the fuel spray 13 issuing from the nozzle 14. Here again, the main part of the fuel is deposited at 7, between the two edges 5 and 10.

In both instances, Figs. 3 and 4, the axial length "h" of the neck portion is up to 30% of the total axial length H of the combustion chamber. The wall of the passage 9 adjacent edge 10 forms with the wall surface 17 of the main combustion chamber an angle $\alpha$ of nearly 90° or less than 90°. Preferably also the angle $\beta$ between the piston head surface 18 and the wall of passage 9 adjacent edge 5 is nearly 90° or even less than 90°, as indicated in Fig. 3.

The fuel nozzle 14 is arranged in such a way that the main part of the fuel is deposited immediately on the inner wall of the passage 9. This offers the advantage that the coaxial rotary motion of the air owing to the maximum contraction has its maximum velocity at the zone of deposition (7) and moreover the squeeze during the flowing in and flowing out of the air with respect to the combustion chamber produces vortices or eddies which contribute to the detaching of the fuel from the zone in which it has been deposited. When the fuel flows into the piston chamber the edge 5, Fig. 4, generates the vortices, whereas when the fuel flows out, the edge 10, Fig. 4, acts to generate the vortices. Hence in both directions of flow the detaching eddies are active at the area of deposition of the fuel (7) which is between the two edges 5 and 10.

As is well known, a sharp edge favors the formation of eddies. According to the invention this fact may be utilized by a concave arching or outward bulging of the neck portion 9, as indicated in Figs. 3 and 4, or by a funnel-shaped inclination of the neck portion, as per the dotted line 12a in Fig. 4a, whereby at the same time the fuel which is sprayed onto the wall in a tangential and inclined direction is guided in such a way that it forms a film in the range defined by the two eddy-forming edges 5 and 10 and is prevented from being scattered towards the cylinder head which would lead to an increased specific fuel consumption.

The effect of the detaching edges can be further improved as follows: The actual direction of flowing-in of the air is constituted of the resultant of the coaxial rotary motion and the radial or axial squeeze flow, taking the form of a spiral, as indicated by the lines 16 in Fig. 6. Therefore, grooves 19 are arranged approximately perpendicularly to the trace of the spiral 16, i. e. to the direction of flow, as indicated by angle γ. Owing to their perpendicular position in relation to the flow, the edges 15 of these grooves 19 are very effective. It is preferred to provide such grooves only in the range of the neck portion 9, since it is intended to promote the detaching phenomenons in this range, while in the main combustion chamber 17 the provision of such grooves would only cause an undesirable increase of the transfer of heat.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claims.

I claim:

1. In an internal combustion engine, a cylinder, a cylinder cover, a piston in said cylinder, a combustion chamber in said piston whose general shape is that of a twofold and constricted body of rotation comprising a large inner part and a small outer part, said small outer part occupying not more than thirty percent of the axial length of said chamber, an inwardly projecting edge created by said constriction and forming the transition between said inner and outer parts, said inner part defining a main chamber portion and said outer part defining an outer passage portion of said combustion chamber, fuel nozzle means in said cover eccentric to and inclined with respect to the cylinder axis for applying substantially all of the fuel onto the wall of said outer passage portion as a thin film, and means for imparting a rotary motion to the intake air entering said combustion chamber in the same general direction as the fuel is applied onto the wall of said outer passage portion for gradually detaching the fuel in the form of vapor from the wall of said passageway portion and mixing said vapor and said air.

2. In an internal combustion engine as in claim 1, said inwardly projecting edge further comprising a sharp edge.

3. In an internal combustion engine as in claim 1, said outer passage portion comprising a funnel-shaped passage portion.

4. In an internal combustion engine as in claim 1, said outer passage portion forming angles of about 90°, respectively, with the surface of said piston and the wall of the main chamber portion.

5. In an internal combustion engine as in claim 1, said outer passage portion forming angles of less than 90°, respectively, with the surface of said piston and the wall of the main chamber portion.

6. In an internal combustion engine as in claim 1, said small outer part further comprising a surface generated by revolving a straight line.

7. In an internal combustion engine as in claim 1, said small outer part further comprising a convex surface generated by revolving a curved line.

8. In an internal combustion engine as in claim 1, said small outer part further comprising a concave surface generated by revolving a curved line.

9. In an internal combustion engine as in claim 1, said small outer portion further comprising a grooved surface having the edges between adjacent grooves lying perpendicular to the direction of the air current flowing into the combustion chamber.

References Cited in the file of this patent

UNITED STATES PATENTS

| 1,759,160 | Lang | May 20, 1930 |
| 2,151,218 | Lutz | Mar. 21, 1939 |

FOREIGN PATENTS

| 670,635 | France | Dec. 2, 1929 |
| 899,973 | France | June 15, 1945 |